Jan. 14, 1941.   R. J. FIELD   2,228,949
PIN FASTENER
Filed Feb. 9, 1939

Inventor
Richard J. Field,
Bernard F. Dawey
Attorney

Patented Jan. 14, 1941

2,228,949

UNITED STATES PATENT OFFICE 2,228,949

PIN FASTENER

Richard J. Field, Baton Rouge, La.

Application February 9, 1939, Serial No. 255,535

1 Claim. (Cl. 24—152)

My present invention consists of a pin fastener which is especially adapted for use in securing a seat cover to an upholstered seat, although I have found it to be useful for various other purposes.

In attaching seat covers, especially to the upholstered seats of motor vehicles, I have encountered great difficulty and after experiments with many kinds of fasteners, found that for use on removable seat covers, penetratable fasteners capable of expeditious application to and removal from the cover and seat are preferable if the pin fastener can be secured, from casual displacement, without extraneous means. The pin fastener of the present invention is the result of many actual tests and embodies every prerequisite for successful use in this art, in so far as I have been able to ascertain, it being simple in construction, inexpensive to manufacture, easily and quickly engaged with and from the work, as well as positive in its operation and free from casual displacement.

Figure 1:
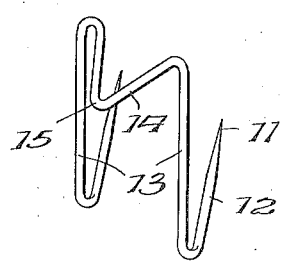
Figure 2:
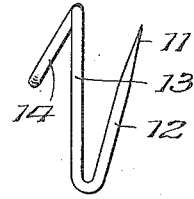
Figure 3:
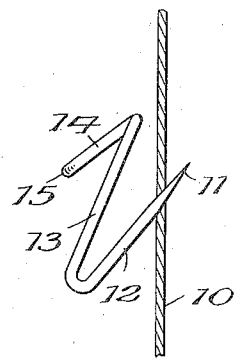
Figure 4:
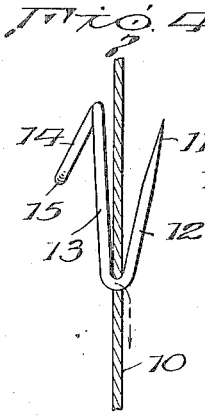
Figures 4A, 5:
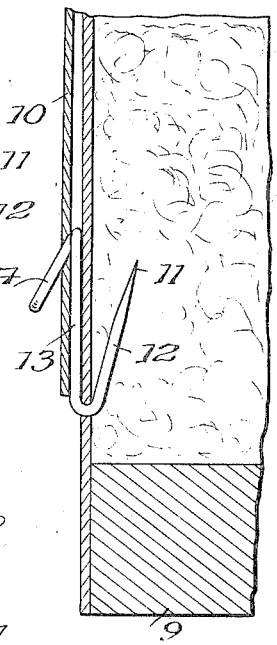

While the fastener of the present invention is, as above stated, especially adapted for use in securing seat covers of motor vehicles, nevertheless many other uses will suggest themselves to those skilled in the art to which this invention relates and other objects of the invention will be apparent from the following description of the present preferred forms of the invention wherein:

Fig. 1 is a perspective view of a pin fastener constructed in accordance with the present invention, Fig. 2 is a side elevational view of the same, Fig. 3 is a side elevational view of the fastener and a sectional view of a seat cover, showing the first step in engaging the fastener with the cover, Fig. 4 is a similar view showing the position of the pin when the next step has been completed, Fig. 4a is also a side elevational view of the fastener and a sectional view of the cover showing the final step in engaging the fastener with the cover, Fig. 5 is a side elevational view of the pin fastener after the latter has been completely engaged with the cover, pursuant to the final step in engaging the fastener with the cover, illustrating the manner of securing the cover to a seat through the instrumentality of the fastener.

Figure 6:
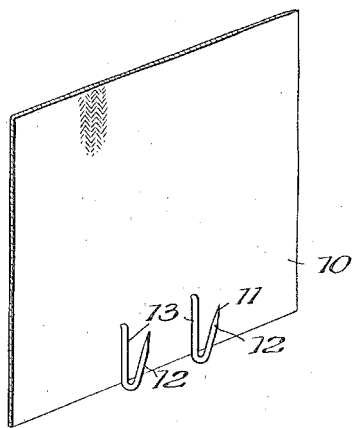
Figure 7:
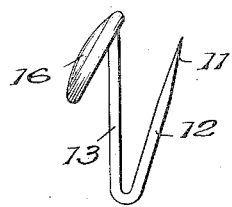

Fig. 6 is a detail fragmentary perspective view of a cover showing the position of the fastener hooks on one side of the latter after completion of the steps necessary to engage the fastener with the cover preparatory to engaging the same with a seat, and Fig. 7 is a side elevational view of a modified form of pin fastener showing a cap mounted on the fastener head.

In the drawing in order to illustrate the application of this invention, I have in Fig. 5 fragmentarily shown a seat 9 and a seat cover 10, the latter also being illustrated in Figs. 3, 4, 4a and 6.

The fastener of the present invention consists of a wire strand, the ends of which are arranged in parallel relation and the terminals pointed, as indicated at 11, to provide prongs 12. An intermediate portion of the strand is bent into substantially parallel relation with the prongs 12 to provide shanks 13, the latter issuing into a head 14. The head 14 is formed from a portion of the strand midway the ends of the pointed terminals 11 and consists of a loop, closed at one end, the loop being preferably of substantially V-shape conformation. The apex of the head projects outwardly to provide a finger grip or abutment 15 for a purpose which will be more fully hereinafter apparent.

If desired the head 14 may be encased in a cap 16 after the fashion shown in Fig. 7 of the drawing. The cap is preferably of conventional design and provided with an annular recess into which the sides or arms of the V-head 14 may be flexed in an apparent manner.

In using the fastener of the present invention it is necessary that the pointed terminals 11 of the prongs 12 be urged upwardly in penetrating the article to be secured, as advantageously illustrated in Fig. 3. After the prongs 12 have passed completely through the article, lateral pressure is exerted on the head 14 in the direction of the prongs 12. This places the fastener in a position where the shanks 13 may be pushed downwardly through the openings formed by the prongs 12, as the latter passed through the article. When the fastener has been pushed downwardly until the shanks 13 have completely passed through the openings in the article 10, parallel hooks are provided on one side of said article, as shown to advantage in Figs. 5 and 6. These hooks may then be easily and expeditiously engaged with an object to which the article is to be secured or anchored, as illustrated in Fig. 5. There is no possibility of the shank 13 passing completely through the article 10 because the head 14 serves as an abutment for this purpose. The pin fastener may, of course, be disengaged from the object 9 in a manifest manner and in an equally manifest manner may, if desired, be disengaged from the article 10.

I have found that with this type of pin fastener, seat covers can be drawn taut on the seat and then secured to the same without sacrificing any of the tautness. Furthermore the fasteners can be engaged with and disengaged from the cover and seat, only by following a predetermined modus operandi. Consequently, the fastener will not be casually displaced regardless of the severity or line of direction of contact therewith. By everting the head 14, to provide a finger piece 15, engagement and disengagement of the fastener is facilitated without subjecting the fastener to likelihood of accidental displacement.

Various changes may be made in the details of construction, proportion and arrangement of parts within the scope of the claim hereto appended.

What is claimed is:

In combination with a vehicle seat and cover therefor, a pin fastener for use in fastening said cover to a seat including a one-pieced body of wire comprising two pointed terminal portions engageable into the seat and a pair of upstanding substantially parallel shank arms snugly engageable with an external face of the seat, said shank arms being only slightly greater in length than said pointed arms to facilitate engagement of the latter in the seat, and an intermediate loop portion connecting said shank arms and arranged to lie externally of the seat cover, the loop being laterally offset to provide a finger abutment.

RICHARD J. FIELD.